United States Patent [19]
Goto

[11] Patent Number: 5,560,174
[45] Date of Patent: Oct. 1, 1996

[54] CONNECTOR

[75] Inventor: Yasuo Goto, Oita, Japan

[73] Assignee: Home Co., Ltd., Oita-ken, Japan

[21] Appl. No.: 330,584

[22] Filed: Oct. 28, 1994

[30] Foreign Application Priority Data

Oct. 30, 1993 [JP] Japan .................... 5-294137

[51] Int. Cl.$^6$ .................................... E04C 5/03
[52] U.S. Cl. .................. 52/655.1; 52/656.9; 52/726.1; 52/653.2; 403/268; 403/267
[58] Field of Search ............... 52/655.1, 653.2, 52/656.9, 726.1, 726.2, 726.3; 403/268, 267, 405.1; 156/304.2, 381

[56] References Cited

U.S. PATENT DOCUMENTS

| 3,969,871 | 7/1976 | Ewers .................. 52/655.1 |
| 4,637,193 | 1/1987 | Lange .................. 52/655.1 |
| 5,466,086 | 11/1995 | Goto . | |

FOREIGN PATENT DOCUMENTS

| 311834 | 4/1989 | European Pat. Off. ........ 52/653.2 |
| 690135 | 10/1979 | U.S.S.R. ........ 52/655.1 |

Primary Examiner—Carl D. Friedman
Assistant Examiner—W. Glenn Edwards
Attorney, Agent, or Firm—Lane, Aitken & McCann

[57] ABSTRACT

It is an object of the present invention to provide a connector in which the connector can be inserted into or fixed to in advance the abutting surfaces of the structural members to be connected, an adjustment of direction of the connector is not required, its workability and installing work can be remarkably improved at the same time the connector inserted into and fixed during connection can be prevented from being pulled off and its superior high safety in shearing resistance is attained. This connector is comprised of a connecting plate 2 formed in a flat plate; a hollow tubular member 3 having its one end fixed to both surfaces of said connecting plate 2 and the other end opened; a branch pipe engage part 7 communicating from a side part of the base end of said tubular member 3 to hollow part; a hollow branch pipe 8 having an engage part 9 removably engaged with the branch pipe engage part 7 formed at at least one end thereof; and a fixing hole 12 formed at a predetermined part of the connecting plate 2.

5 Claims, 11 Drawing Sheets

FIG. 4-a
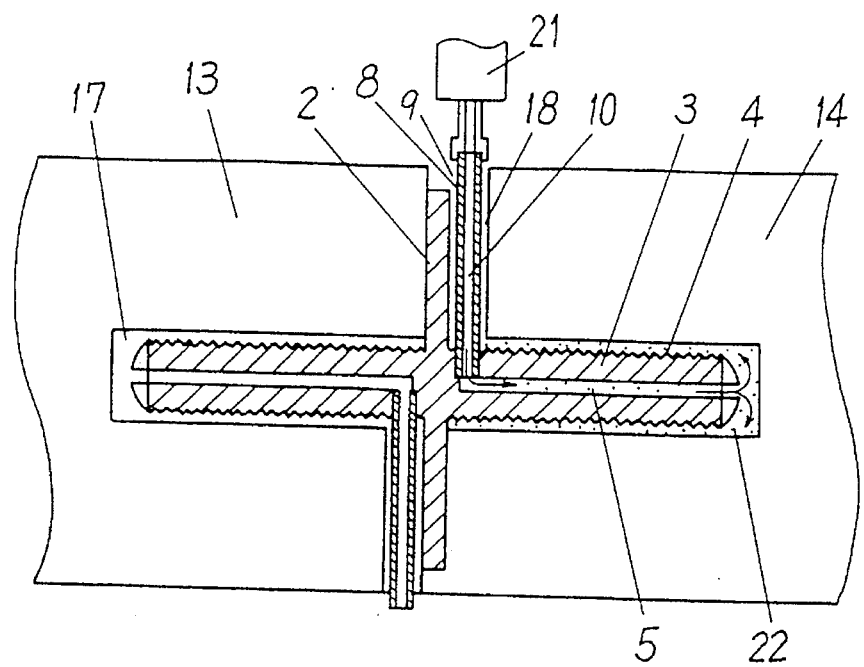
FIG. 4-b
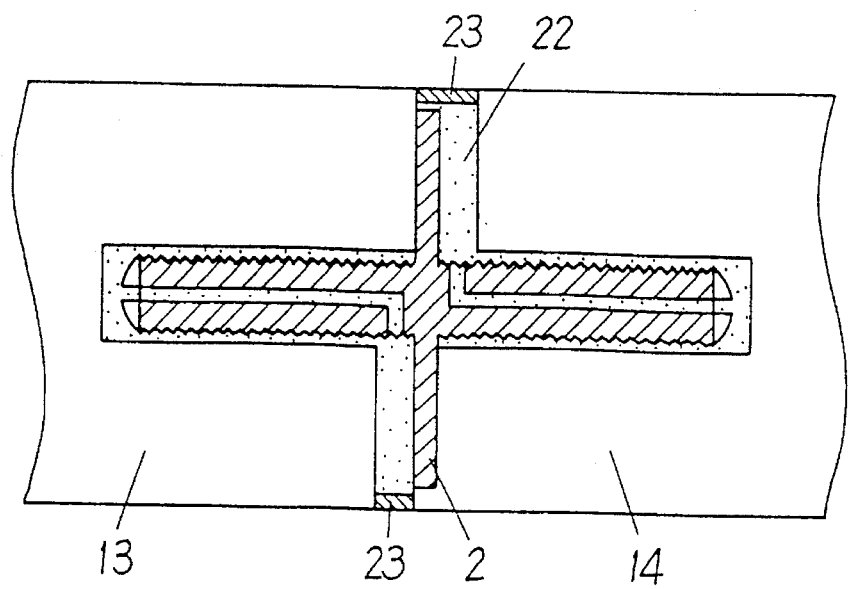

FIG. 8-a
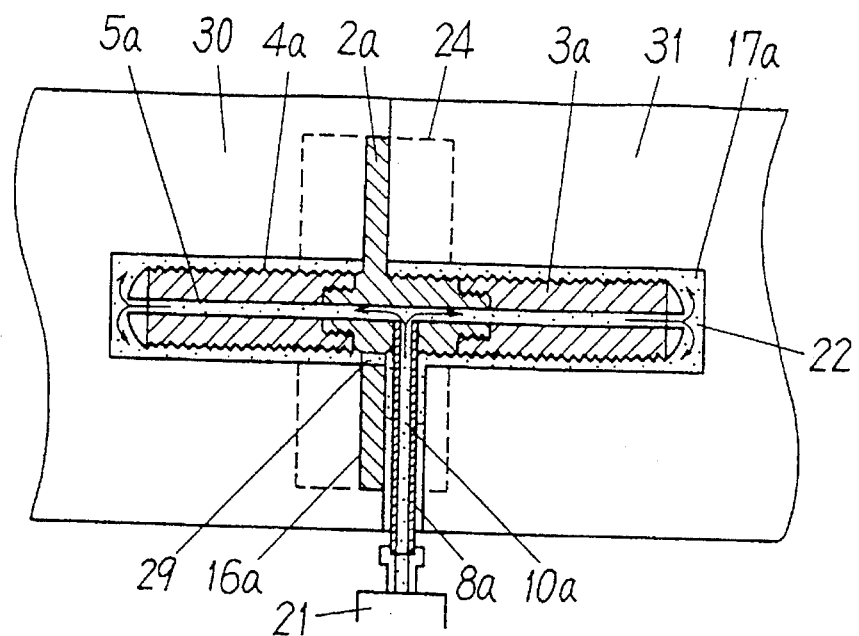
FIG. 8-b
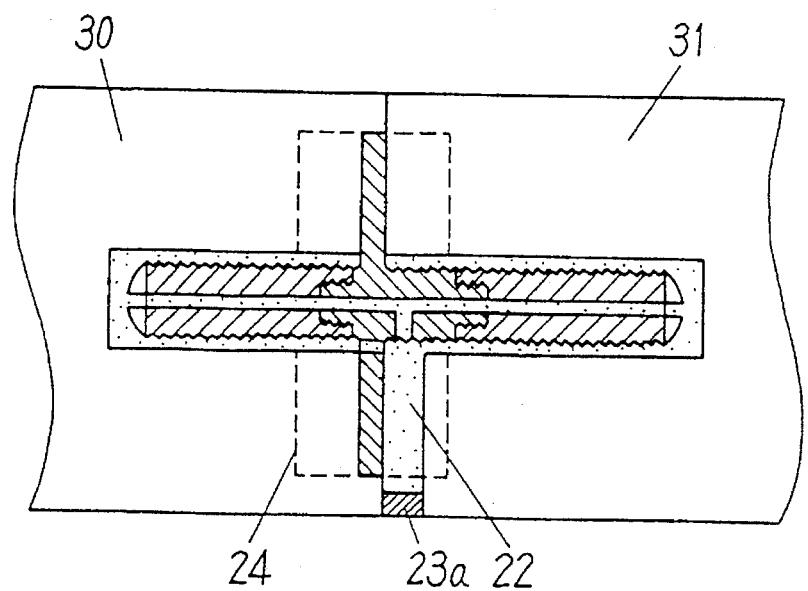

FIG. 15-a
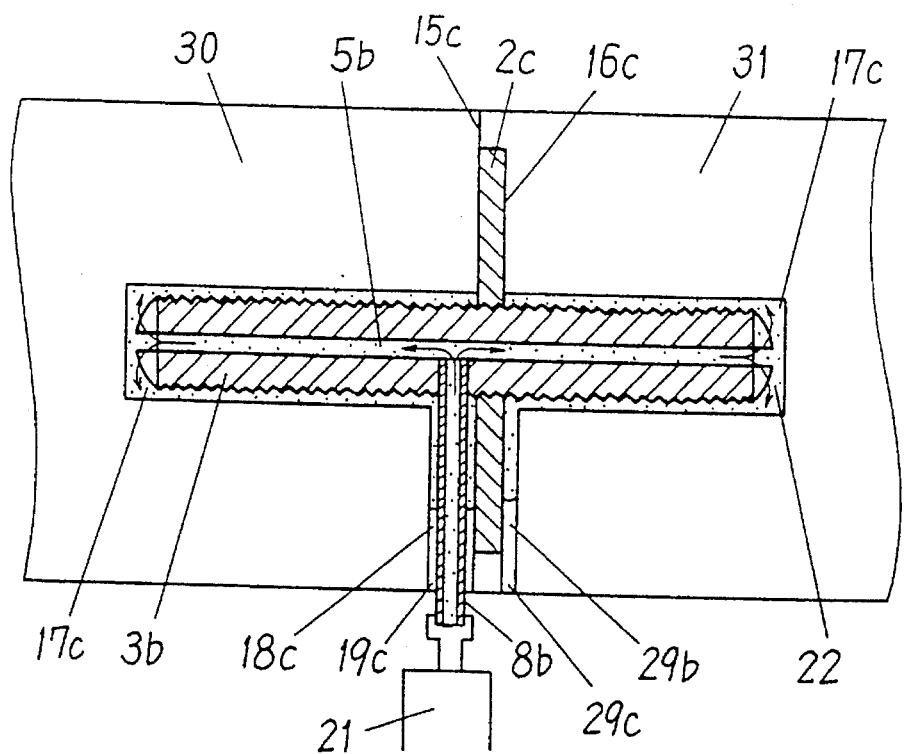
FIG. 15-b
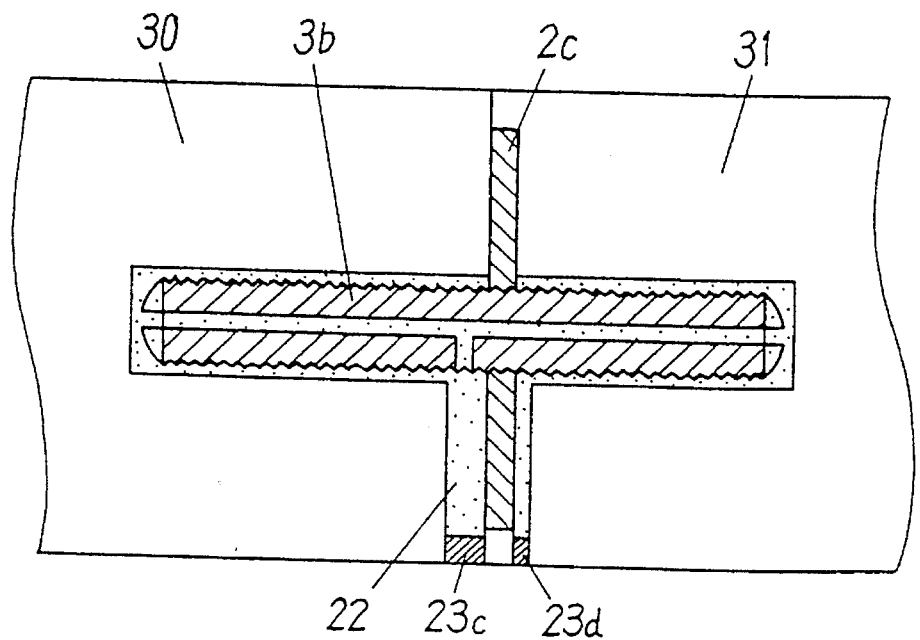

CONNECTOR

BACKGROUND OF THE INVENTION

1. Field of the Invention

This invention relates to a connector for use in connecting inter-timbers, inter-laminated woods, inter-stone members, inter-concrete members, or between timbers, laminated woods and stone members, concrete members and the like.

2. Description of the Related Art

In recent years, there have been developed the connectors for use in connecting between a beam and a pole plate, between a pole plate and a column, between a furring and an independent column so as to provide a labour saving and a streamlining or the work in a building such as a dwelling and the like or similarly developed a connection structure or a coupling structure so as to get a streamlining of the work.

For example, ① the gazette of Japanese U. M. Laid-Open No. Sho 63-162008 discloses a framework jig used in a wooden framework process, ② the gazette of Japanese U. M. Laid-Open No. Hei 2-93401 discloses a reinforcing jig at a connection part between a lower end of a column and a foundation of a framework type wooden building, ③ the gazette of Japanese Patent Laid-Open No. Hei 3-295946 discloses trap dowel jig and a lathing structure of the framework wooden building applied with the trap dowel jig, ④ the gazette of Japanese Patent Laid-Open No. Hei 2-300442 discloses a connecting structure of wooden structural material in which the wooden framework is not decomposed after connection. In these prior arts, fittings, bolts and nuts are used at the connection between the structural members.

In addition, as the connection structure, Japanese Patent Laid-Open No. Sho 63-14939, Japanese Patent Laid-Open No. Sho 63-14940 and Japanese Patent Laid-Open No. Sho 63-14941 disclose the connection structure in the wooden framework structure so as to improve a structural strength of the connection structure.

However, there were problems that the aforesaid prior art connector or connector structure required a large number of parts such as bolts, nuts, washers and the like, a troublesome fixing work was required and a lack of workability occurred when they were worked. In addition, it had other problems that the metal fitting was large in size, had a heavy weight, it lacked in a transporting characteristic and lacked in safety at a high location.

There was also another problem that an erroneous metal fitting occurred during the work, a troublesome operation was needed, an embedding of the cylinder or plug member punched at the predetermined position into a desired location and a threadable fitting of bolts into said embedded cylinder or the punched hole of the plug member was difficult, requiring a poor workability, a large number of steps of work and an extended work period.

The assembly having some timbers fixed by bolts or nuts had some problems that their fastening forces were lost in several years due to shrinkage of timbers to cause a certain looseness to be easily produced there and its physical strength was also reduced. In addition, it had a still another problem that the metallic portions such as bolts, nuts, metal fittings were oxidized by dew formation etc. to reduce a durability of the assembly and also some imported timbers contained salt due to their storage on the sea, the bolts, metal fittings and the like in the assembled imported timbers were decayed by salt to deteriorate a physical strength and produce a poor durability.

In addition, at the time of occurrence of fire, the prior art assembly had a certain problem of anti-disaster in which the outer connector bolts, metal fittings etc. were melted at first, their strength could not be expected and a housing was crushed by these causes. In addition, the most serious disadvantage of the framework structure having wooden timbers consisted in a weakness at the connection part and in view of this fact, various kinds of connections or couplers have been devised by many carpenters from the ancient period to keep their physical strength in the framework, although all these structures had some problems that they were complex, required many working steps and showed a poor productivity. There was another problem that the wooden timber having a heavy timber had a less amount of production, its preparation was difficult and the beams made of wood or laminated wood having a long and large span could not be transported on the road due to a traffic regulation and the like.

SUMMARY OF THE INVENTION

In view of the foregoing, the present inventor has studied vigorously in order to solve the aforesaid problems in the prior art and completed the connector capable of remarkably improving a structural strength in combination with the adhesive agent, increasing a connecting workability at the connector, coupler, or connection and shortening a working period; a connecting method for coupling some structural members in which the machining technology for connector, coupler or connection is simplified by using the connector, the number of steps of work is remarkably reduced and its productivity is superior; and a connecting structure between the structural members showing a superior structural strength as well as a higher anti-disaster effect and filed a patent application as Japanese Patent Appln. No. Hei 4-164402.

However, although the aforesaid invention is superior in its installing work, workability, productivity and the effect of anti-disaster etc. as compared with the prior art connector or installing method, it has been found that when the connector is to be fixed, it must be inserted into each of the abutted surfaces when the structural members are connected, the alignment in the directions of the connectors requires a troublesome work due to a looseness at the connecting holes and their process is complex and lacks in workability. It has been also found that the prior invention had in safety in which the connector is dropped off during its installing work at a high location.

The present invention has an objective to provide a connector as follows to solve the aforesaid prior art problems. The connector can be inserted into and fixed in advance to the abutted surface of the structural members to be connected, so it is not necessary to align the directions of the connectors respectively. As the result, the workability and installing work can be remarkably improved and the connector can be prevented from being dropped off and has a high shearing resistance and a high safety characteristics.

In order to achieve this object, the present invention has the following configuration.

The connector described in claim 1 has a configuration comprising a connecting plate formed in a flat plate; a hollow tubular member having each of its base parts fixed to both surfaces of said connecting plate and the other end opened; a branch pipe part communicating from a side part of the base part of said tubular member to said hollow part; and a hollow branch pipe having an engage part removably engaged with said branch pipe engage part formed at at least one end thereof.

The connector described in claim 2 is comprised a connecting plate formed in a flat plate; a hollow connecting member having a convex or a concave member engage part at both ends fixed to a hole punched at the plate surface of said connecting plate or removably inserted into the hole; a branch pipe engage part communicating from the side surface of said connecting member to said hollow part; and a hollow tubular member having a connecting plate engage part removably engaged with said base part of member engage part.

The connector described in claim 3 has a configuration comprising of a connecting plate formed in a flat plate; holes punched at a plate surface of said connecting plate; a hollow tubular member having both ends opened fixed to or removably inserted into said hole; a branch pipe part communicating from a side part in a longitudinal direction of a central part of said tubular member to said hollow part; and a hollow branch pipe having an engage part removably engaged with said branch pipe engage part formed at at least one end thereof.

The connector described in claim 4 has a configuration of any of claim 1 in which the surface of said tubular member is formed with a projection part or a concave or convex part.

The connector described in claim 5 has a configuration of any of claim 1 in which the plate surface or end part of said connecting plate is formed with a reinforcing part projected substantially at a coaxial direction to said tubular member.

The connector described in claim 6 has a configuration of any of claim 1 in which said branch pipe is fixed to said branch pipe engage part.

In this case, the connecting plate of the connector is constructed such that a complex material having metal such as iron with as its top plan view shape, a substantial circle, a substantial ellipse or substantial polygon such as triangle, square, pentagon, hexagon etc. or organic, non-organic fibers of carbon fiber, boron fiber, glass fiber, metallic fiber etc. and synthetic resin, ceramics using cement and its complex product etc. are properly selected in according to an installing site.

A sectional shape of tile tubular member may have a substantial circle, a substantial ellipse, a substantial polygon in compliance with a size or shape of structural members to be connected, and its material quality may be of a single layer having the same material quality as that of the connecting plate or a multiple layer structure in which more than two material quality in response to a required strength or a diameter size. The multiple layer structure enables the connector to be lighter in weight and a multiple application of adhesive agent to be attained.

Adhesive agent feeding hollow part is formed in a longitudinal direction at a substantial central part of the tubular member from its end to the branch pipe engage part. The number of tubular members to be removably fixed to or engaged with both surfaces of the connecting plate can be the same number from each other or different from each other with the connecting plate being placed therebetween. A diameter of the tubular member can be formed to be the same diameter or different diameter. With such an arrangement as above, a shape or a diameter of the tubular member can be properly selected in response to a shape, a size or a required strength of the structural members to be connected to each other.

The branch pipe engage part may be formed with a hole communicating from the side part of the connecting plate of the tubular member to the hollow part or formed only at an opening side of the hole.

It is preferable that the projection or concave or convex part formed at the outer surface of the tubular member may be of a continuous projection or a non-continuous projection in random form or it may act as a buffer for adhesive agent flowed out of the other end of a helical tubular member, the adhesive agent is filled between the outer surface of the tubular member and a circumferential wall of a communication hole of the structural member so as to expand an adhering area and at the same time they are formed into such a shape as one for applying an engaging effect. In accordance with the installing site or the kind of adhesive agent (having a high viscosity), one or a plurality of projections may be formed or may not be formed at the tubular member or at the end part of the branch pipe of the adhesive agent returning side. In accordance with a viscosity of the adhesive agent, a width or a depth of the concave or convex part of the helical groove may be formed or may not be formed.

Although a shape of at least one end (an adhesive agent flowing-out side) of the tubular member may be of any of a bulged-out shape, a flat shape or a concave or convex shape, it is efficient that the shape is properly selected in response to its application or the kind of the structural member. For example, between the timbers or the laminated woods, the bulged-out materials can be inserted or fixed by pressing the wooden tips etc. and in the ease that concrete or stone material is applied, the concave members can be inserted or fixed while they are crushing the convex parts in the hole and further as the mirror surface of the hole, the flat material can be preferentially applied. The flowing-out end of the tubular member for the adhesive agent is formed with a guiding part such as a groove or a recess for guiding the fed adhesive agent to enable the adhesive agent to be smoothly guided between the surface of the tubular member and the circumferential wall of the connecting hole. As the result, a feeding workability of the adhensive agent can be improved.

Although it is preferable that the tubular member or the hollow part of the branch pipe is finished mirror surface to reduce a flowing-in resistance of the adhesive agent, the mirror surface machining may not be performed when a viscosity of the adhesive agent is low.

The adhesive agent is properly selected in response to the kind of structural members, such as the timber to timber, the laminated wood to laminated Hood, the timber to laminated wood, the timber or laminated wood to stone material, concrete structures, the stone material to concrete structures etc. As a practical example, various organic adhesive agents of epoxy resins or polyurethane resin etc. or non-organic adhesive agent such as mortar, etc. is used. Feeding of the adhesive agent can be efficiently carried out in a double-stage feeding method or a pressurizing feeding method in the case that a large-sized timber or laminated wood or concrete structure is applied or in the case that a viscosity of the adhesive agent is high.

It is preferable that a diameter of the hollow part is formed to be $9/10$ or less of that of the tubular member, preferably $3/5$ or less and further preferably $1/3$ or less and it is formed to be small in such a manner that it may not infringe a flowing-in of the adhesive agent so as not to decrease a mechanical strength such as a shearing force or a bending stress of the tubular member.

The hollow parts of the tubular members fixed to or removably engaged with a substantial coaxial shaft with the connecting plate being held between the tubular members are formed with member communicating holes communicated to each other, thereby it is satisfactory that only one branch pipe engage part engaged with the branch pipe for use in feeding adhesive agent may be formed and the number of times of feeding adhesive agent is also reduced, resulting in that its workability can be improved. In this case, it is desirable that the branch pipe engage part is formed at a side part of the connecting plate of one of the right and left tubular members with the connecting plate being held between them. The reason why such an arrangement as above is applied consists in the fact that lengths of the hollow parts become substantially the same to each other at the right and left sides around the branch pipe holes so as to cause the flow speeds of the adhesive agent to be substantially the same to each other and returning periods of the adhesive agent to become same to each other. In the case that lengths of the right and left communicating tubular members are different from each other, it is necessary that the diameter of the longer hollow part is made larger and the shorter one is made smaller to change the flow speed of the adhesive agent and their returning periods are made same to each other.

In addition, the hollow part of the connecting member may be filled with a rigid one. In the case that the lengths of the tubular members are different from each other, it is possible that the hollow parts of the connecting members are made rigid, each of the branch pipe engage parts is arranged while the connecting plate being held between them, thereby a positive feeding of the adhesive agent can be carried out steadily.

In addition, in the case that either the connecting plate or the connecting member is formed with the member communicating holes so as to cause the hollow parts of the tubular members to be communicated to each other, although only one branch pipe for feeding adhesive agent is sufficiently provided, it is satisfactory that the connecting plate may be formed with an air releasing hole so as to perform a smooth charging of the adhesive agent at the side where the branch pipe engage part is not formed while the connecting plate being held between them. This air releasing hole is constructed such that the connecting plate is formed with a small hole in such a method that the air releasing hole may be contacted with an outer circumference of the tubular member. In addition, in the case that the member engage part of the connecting plate is formed as a threaded hole and only one tubular member is applied, it is satisfactory that the connecting plate engage part threadably engaged with the connecting plate at the surface of the tubular member may be formed with a concave groove. In the case that the air releasing hole is not provided, it is necessary to provide an air releasing and adhesive agent visual checking hole for use in releasing air and confirming a filled state of the adhesive agent at the abutting surface of the structural member where the branch pipe is not arranged while the connecting plate is being held during its installing work.

An engaging method in which the tubular member is removably engaged with the connecting plate is carried out such that the member engage part or the connecting plate engage part is formed with the threaded holes so as to cause them to be threadbly engaged to each other or formed with fitting parts so as to cause the fitting parts to be fitted and engaged to each other.

The reinforcing part formed at the plate surface or end part of the connecting plate is fitted to a concave part formed at the connecting surface of the structural member connected when the structural member is to be connected and embedded in the concave part, a stress applied to the tubular member is dispersed so as to prevent shearing or twisting of the member and thus it is punched in a substantial same axial direction of that of the tubular member at the plate surface or the end not hindering installation of the branch pipe. It is preferable that a shape of the reinforcing part is formed into a flat plate in which a contacted surface with the structural member is wide and machining of the concave part of the fitted connecting surface can be easily carried out.

The connecting plate is formed with more than one fixing holes for use in fixing the connector with small screws or spikes to the connecting surface of the structural member in order to prevent the connector from being dropped off when the structural member is assembled with the framework. In place of the fixing hole, it is also possible to provide the projection having an acute extremity in the connecting plate and to fix it by the projection.

With such an arrangement as above, since it is possible to embed and fix the metallic connector to the connecting part between the structural members and to make a remarkable improving of a connecting stress against bending, tension, compression and shearing etc. In addition, a stress against the shearing or twisting and the like can be improved more by projecting the reinforcing parts at the connecting plate. Shape, opening diameter, length and number of tubular members can be selected according to a strength required at the connecting locations. Since the tubular member inserted into and fixed to the connecting hole between the structural members is fixed to or engaged with in advance to the flat plate-like connecting plate at its predetermined position, inserting or fixing of the tubular member to the structural members can be carried out in one-touch operation. Since the connecting holes are filled with the connector and the adhesive agent at its outer circumference, it is possible to improve a mechanical strength against the bending stress and the like and the connector is covered by the adhesive agent to enable the connector to be prevented from being oxidized with dew formation or weakened with salt. In the case that the hollow parts of the tubular members are communicated to each other while the connecting plate is being held between them, it is possible to prevent glue non-uniformity of the adhesive agent from being generated by the air releasing hole. In addition, since the tubular members can be fixed to the connecting part of the structural member through the fixing hole or the projection formed at the connecting plate, it is possible to prevent the connector from being pulled out of it during an installing work of the framework.

As described above, the present invention is constructed such that the tubular member is fixed or removably engaged with the connecting plate corresponding to a size and a shape of the structural member to be connected to enable the tubular member to be inserted to and fixed to the connecting surface of the structural member in one-touch operation, the connector can be inserted and fixed at the time of pre-cutting the connecting hole, so that it is not necessary to perform an inserting or fixing at a high location during the framework installing operation, a superior workability and a superior installing work can be attained and the connector is not pulled out of the members and is not dropped. In addition, the tubular member is removably engaged with the connecting plate, thereby a length and the number of tubular members are changed in compliance with a shape of the structural member or a required strength, so that it is possible to reduce the kind of the connector, the number of component parts, and to realize a labor saving of the material and a streamlining of the work.

In addition, since the connector and the adhensive agent are completely embedded within the structural member, it is possible to prevent deterioration of adhesive agent caused by ultraviolet ray and to realize the connection of the structural member which is superior in safety and durability.

BRIEF DESCRIPTION OF THE DRAWINGS

FIG. 4-a is a sectional view of a central substantial part of the connection hole to indicate a state when the connection work is carried out by using tile connector in a first preferred embodiment of the present invention.

FIG. 4-b is a sectional view of a central substantial part of a connection hole to indicate a state after a connection work is carried out by using a connector in a first preferred embodiment of the present invention.

FIG. 8-a is a sectional view of a central substantial part of a connection hole to indicate a thrust joint execution for a beam by using a connector in a second preferred embodiment of the present invention.

FIG. 8-b is a sectional view of a central substantial part of a connection hole to indicate a state after a thrust joint execution for a beam by using a connector in a second preferred embodiment of the present invention.

FIG. 15-a is a sectional view of a central substantial part of a connection hole to indicate a state when a thrust joint execution for a beam member by using a connector in a fourth preferred embodiment of the present invention.

FIG. 15-b is a sectional view of a central substantial part of a connection hole to indicate a state after a thrust joint execution for a beam member by using a connector in a fourth preferred embodiment of the present invention.

DESCRIPTION OF THE PREFERRED EMBODIMENTS

Figure 1:
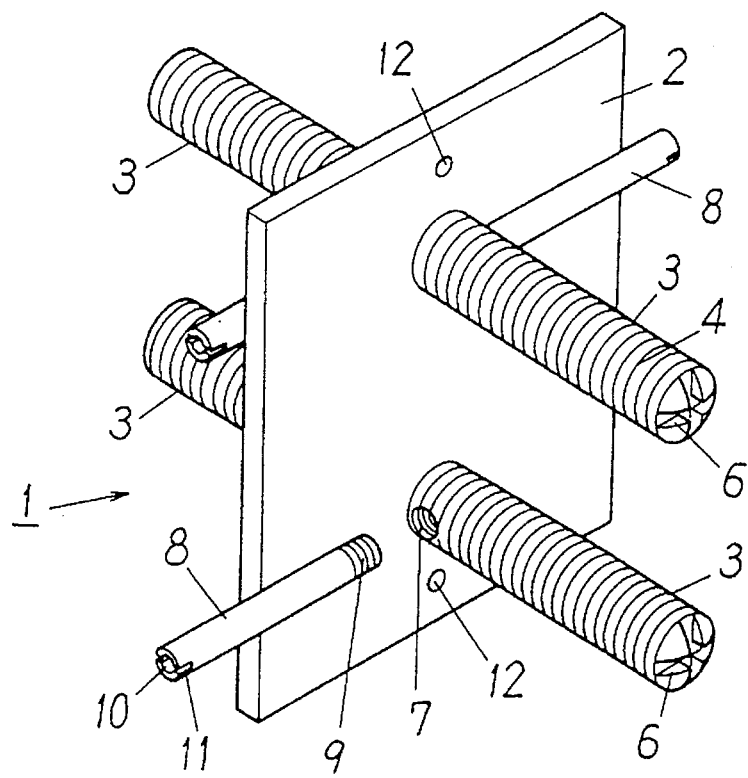
FIG. 1 is an entire perspective view showing a connector in a first preferred embodiment of the present invention.

Referring now to the drawings, one of preferred embodiments of the present invention will be described as follows.

Preferred Embodiment 1

Figure 2:
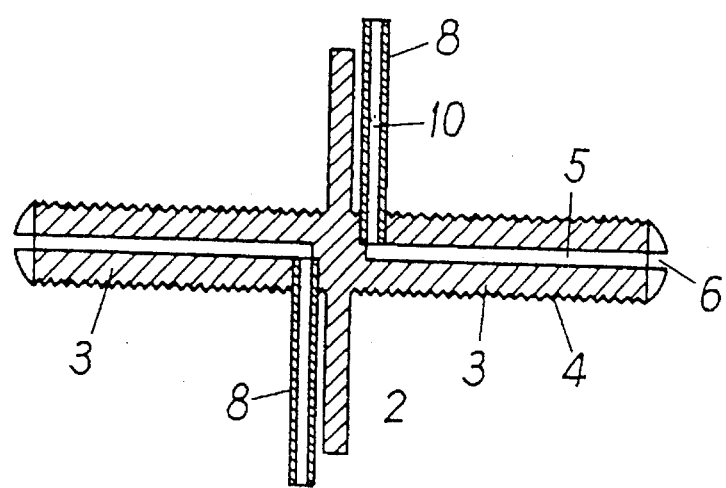
FIG. 2 is a sectional view showing a substantial part of a connector in a first preferred embodiment of the present invention.

FIG. 1 is an entire perspective view showing a connector of a first preferred embodiment of the present invention and FIG. 2 is a sectional view showing a substantial part of a connector in the first preferred embodiment of the present invention.

1 denotes a connector ill the first preferred embodiment of the present invention; 2 denotes a metallic square flat-plate like connecting plate; 3 denotes a hollow rod-like tubular member having one end welded to the connecting plate 2; 4 denotes a concave and convex part formed spirally on the surface of the tubular member 3; 5 denotes a hollow part for use in feeding adhesive agent formed in a longitudinal direction at a substantial central part of the tubular member 3 and having one end opened; 6 denotes an adhesive agent guiding groove formed in a concave shape at an end part of the opening of the tubular member 3; 7 denotes a branch pipe engage part punched to be communicated with up to the hollow part 5 at an end part of the connecting plate 2 of the tubular member 3 and formed in a threaded shape; 8 denotes a branch pipe of synthetic resin threadably engaged with the branch pipe engage part 7 of the tubular member 3; 9 denotes an engage part formed in a threaded shape at the other end of the branch pipe 8 and threadably engaged with the branch pipe engage part 7; 10 denotes hollow part of a branch pipe communicating with the hollow part 5 of the tubular member 3 formed at the branch pipe 8; 11 denotes a driver groove formed at one end of the branch pipe 8; and 12 denotes a fixing hole formed at the connecting plate 2 for inserting and fixing the connector 1 into and to a connecting surface of a structural member and fixing it with small screws and the like as required in response to the ease that the tubular member 3 is short in length.

A plate surface of the connecting plate 2 may be formed with a stripe-like small groove or a concave or convex part in addition to the plane shape. An adhering area between it and a structural member can be expanded by coating the adhesive agent to the plate surface of the connecting plate and an anchoring effect can be applied to it.

A method for connecting the structural member and a connecting structure between the structural members will be described as follows in reference to the connector in a first preferred embodiment of the present invention as described above.

Work Example 1

Figure 3:
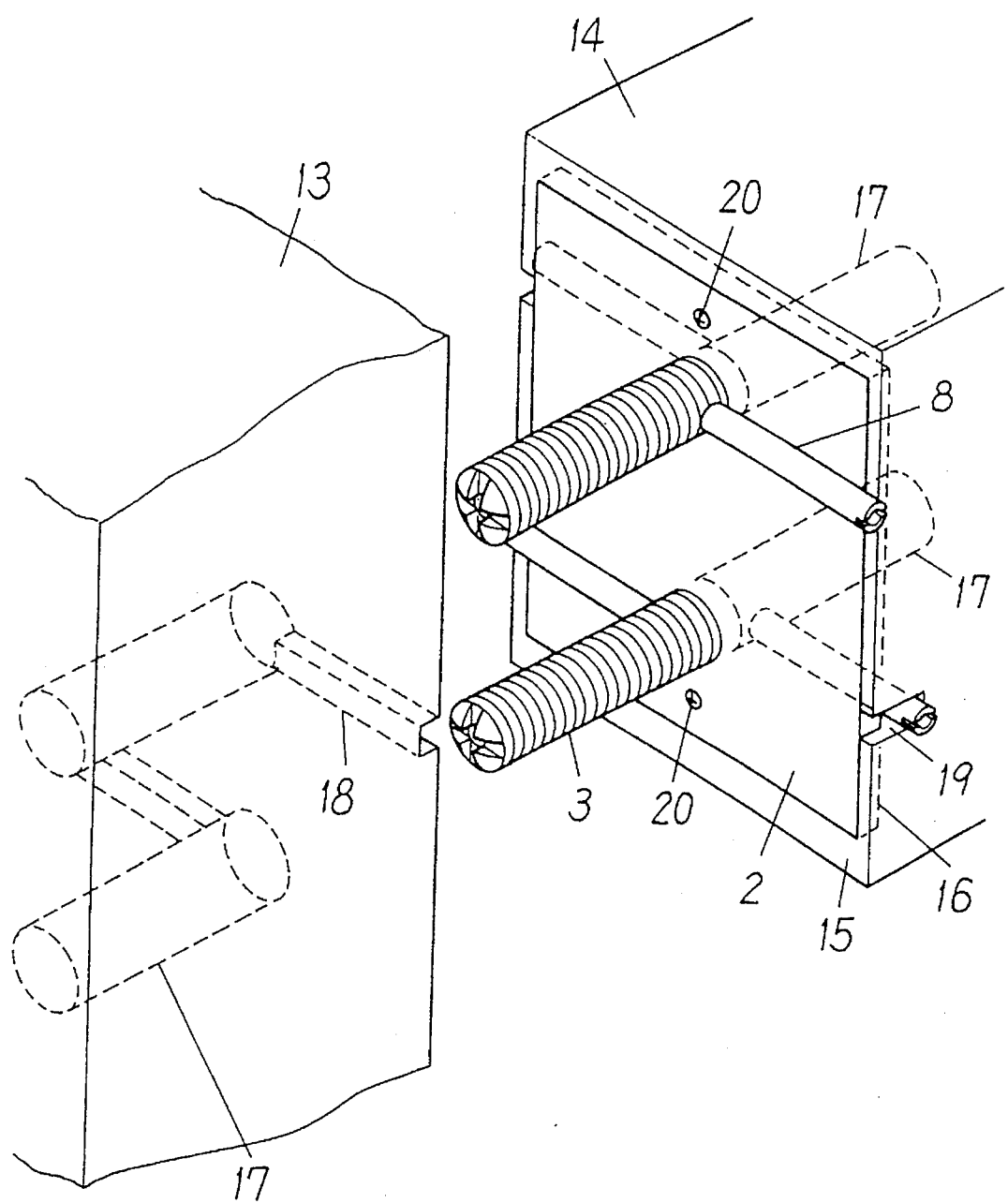
FIG. 3 is a perspective view showing a substantial part when connection of an independent column and furring etc. by using a connector of a first preferred embodiment of the present invention.

FIG. 3 is a perspective view of a substantial part showing that an independent column and a girt are connected by using the connector in the first preferred embodiment of the present invention. FIG. 4-a is a sectional view of a central substantial part of the connecting hole showing a state of connection by using the connector in the first preferred embodiment of the present invention. FIG. 4-b is a sectional view of a central substantial part of the connecting hole showing a state after connecting work by using the connector in the first preferred embodiment of the present invention.

In FIG. 3, 13 denotes a vertical member such as an independent column; 14 denotes a lateral member such as a girt; 15 denotes a connecting surface of each of the vertical member 13 and the lateral member 14; 16 denotes a connecting plate fixing concave part formed in the same size as a thickness of the connecting plate 2 so as to fix the connecting plate 2 to the connecting surface 15 of the lateral member 14; 17 denotes a connecting hole formed slightly larger than a diameter of the tubular member 3 of the connector 1 at the connecting surface 15 of each of the vertical member 13 and the lateral member 14 in advance or at site in a pre-cut method; 18 denotes a branch pipe installing groove cut and formed from an opening of the connecting hole 17 of installing the branch pipe 8 up to an outer circumference of the member at an abutting surface of the connecting hole 17; 19 denotes an opening of the branch pipe installing groove 18; and 20 denotes a small screw for fitting and fixing the connector 1 to the connecting plate fixing concave part 16. In FIG. 4, 21 denotes an adhesive agent pouring gun; 22 denotes an adhesive agent like epoxy resin or polyurethane resin poured from the branch pipe 8 and filled tip to a location where a return flow up to an opening 19 of the branch pipe installing groove 18 while filling the connecting hole 17 through the hollow part 5 of the tubular member 3; and 23 denotes a wooden or synthetic resin plug etc. for use in applying a lid to the opening 19 of the branch pipe installing groove 18 after connection and making in flush with the vertical member 13 and the lateral member 14.

In this case, the connecting plate fixing concave part 16 may be formed with a radiation-shape or a grid-shaped small groove to improve an adhering characteristic with the connecting plate 2.

At first, the adhesive agent 22 poars to the connecting plate fixing concave part 16 formed at the connecting surface 15 of the lateral member 14. Then, the tubular member 3 of the connector 1 having the branch pipe 8 engaged with the branch pipe engage part 7 is inserted into and fixed to the connecting hole 17 formed at the connecting surface 15 of the lateral member 14, the connecting plate 2 is fitted to the connecting plate fixing concave part 16, and the connector 1 is fixed to the lateral member 14 by small screws 20. Then, after applying the adhesive agent to the connecting plate abutting against the vertical plate 13, the lateral member 14 having the connector 1 inserted into and fixed thereto is temporarily fixed with a temporal brace or a strap bolt and other support jigs after the remaining half tubular member 3 is inserted into the connecting hole 17 formed at the connecting surface 15 of the connected vertical member 13 so as to abut the vertical member 13 and the lateral member 14.

An adhesive agent pouring gun 21 is installed at the opening of the branch pipe 8. Then, the adhesive agent 22 is returned back through the hollow part 5 of the tubular member 3 while filling the connecting hole 17, and the agent is filled in the connecting hole 17 up to the location where the adhesive agent 22 is visually checked at the opening 19 of the branch pipe installing groove 18. As shown in FIG. 4-a, the adhesive agent 22 is poured from the branch pipe hollow part 10 as indicated by an arrow, the adhesive agent passes through the hollow part 5 of the tubular member 3 and fills a clearance between the surface of the tubular member 3 and a circumferential wall of the connecting hole 17. During this operation, a channeling or a short pass of the adhesive agent 22 is prevented under a buffering effect of the concave or convex part 4 at the surface of the tubular member 3, the adhesive agent 22 is filled in the clearance without glue non-uniformity. In addition, the pouring is continued and this pouring is carried out until an ascending of the adhesive agent 22 can be visually confirmed while the clearance between an outer surface of the branch pipe 8 and the branch pipe installing groove 18 is being filled with the adhesive agent 22. Since the pouring of the adhesive agent is carried out until the returning flow of the adhesive agent can be visually checked, it is possible to prevent glue non-uniformity.

Upon visual confirming of the adhesive agent 22 at the opening 19 of the branch pipe installing groove 18, the branch pipe 8 is rotated half so as to release an engagement with the tubular member 3.

Then, as shown in FIG. 4-b, the plug 23 is embedded into the opening 19 of the branch pipe installing groove 18 so as to cover its surface in flush with it. If the plug 23 is made of the same material quality as that of the vertical member 13 or the lateral member 14, the plug 23 can be harmony with the structural members to be connected without applying any irregular appearance when the plug is embedded in flush with the structural members.

As described above, according to the present preferred embodiment, one end of the tubular member inserted into and fixed to the connecting surface of the structural member is fixed to the flat-plate like connecting plate, resulting in that a plurality of tubular members can be inserted and fixed in one-touch operation. And after insertion and fixing of the tubular members, they can be fixed to the connecting surfaces of the structural members by the small screws and the like, so that the connector can be fixed when the structural members are pre-cut in advance, a workability as well as an installing characteristic can be remarkably improved. In addition, since the connector is fixed to the connecting surface of the structural member by small screws and the like, no pulling-out and no dropping of the connector occurs when the connector is fixed to the framework to cause a superior safety to be attained.

In the present preferred embodiment, the square-shaped connecting plate is applied, but another circle, ellipse, polygonal shapes etc. may be applied according to a sectional shape of the structural members to be connected or the number of tubular members etc. In addition, a similar alternative may be applied to a sectional shape of the tubular member.

Preferred Embodiment 2

Figure 5:
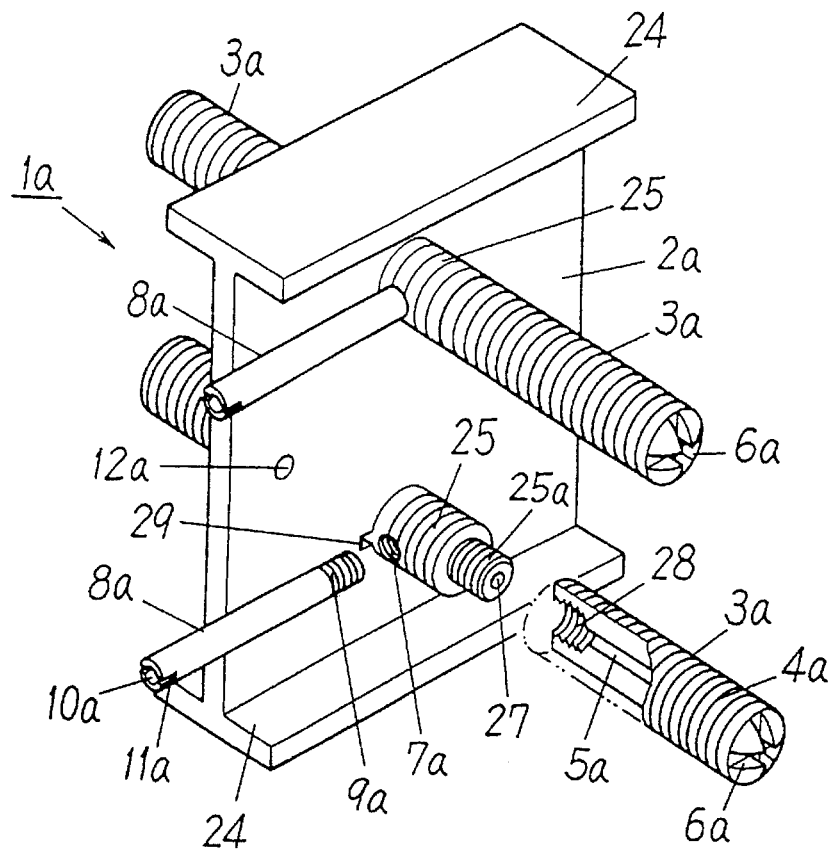
FIG. 5 is an entire perspective view showing a connector in a second preferred embodiment of the present invention.
Figure 6:
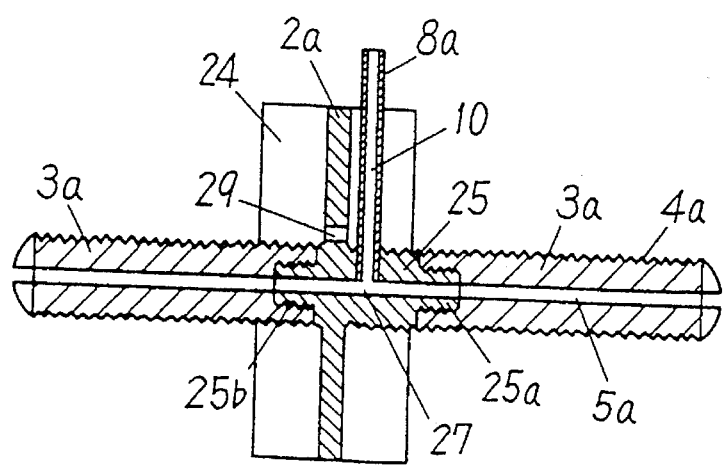
FIG. 6 is a sectional view showing a substantial part of a connector in a second preferred embodiment of the present invention.

FIG. 5 is an entire perspective view showing a connector of a second preferred embodiment of the present invention. FIG. 6 is a sectional view of a substantial part of the connector of a second preferred embodiment of the present invention.

1a denotes a connector in a second preferred embodiment of the present invention; 2a denotes a connecting plate in which reinforcing plates 24 for preventing shearing are formed at both opposing ends of a metallic square flat plate; 3a denotes a tubular member in which the connecting plate engage part 28 formed helically at a hollow base part for removably engaging with the connecting plate 2a; 4a denotes a concave and convex part helically formed at the surface of the tubular member 3a; 5a denotes a hollow part formed in a longitudinal direction of a central substantial part of the tubular member 3a for pouring adhesive agent and having both ends opened; 6a denotes an adhesive agent guiding groove formed in a concave shape at one end of the tubular member 3a formed in a bulged shape; 7a denotes a branch pipe engage part punched to be communicated up to a hollow part at the hollow connecting member 25 formed at the connecting plate 2a to be engaged with the connecting plate engage part 28 of the tubular member 3a and further threadably formed; 8a denotes a branch pipe engaged with the branch pipe engage part 7a of the tubular member 3a; 9a denotes an engage part threadably engaged with the branch pipe engage part 7a formed at one end of the branch pipe 8a; 10a denotes a branch pipe hollow part communicating with the hollow part 5a of the tubular member 3a formed at the branch pipe 8a; 11a denotes a driver groove formed at one end of the branch pipe 8a; and 12a denotes a fixing hole formed at the connecting plate 2a for inserting and fixing the connector 1a as required to the connecting surface of the structural member with small screws etc. By the way, in the case that there is no possibility that the connector may be dropped off during work such as a case in which a length of the tubular member 3a is long, the fixing hole 12a may not be formed. 27 denotes a member communication hole formed at a central part in section of the connecting member 25; and 29 denotes an air releasing hole formed in the connecting plate 2a along an outer circumference of the connecting member 25.

In this case, the member engage part 25a of the connecting member 25 having the branch pipe engage part 7a is formed long in view of a thickness of the connecting plate 2a as compared with the member engage part 25b. This is applied in order to make lengths ranging from the branch pipe engage part 7a to both ends of the tubular member 3a same and to make a uniform flowing speed of the adhesive agent. In addition, the air releasing hole 29 is used for performing a smooth filling of the adhesive agent in the connecting hole at a side where the branch pipe 8a is not fixed while the connecting plate 2a being held between them, wherein in the case that the air releasing and adhesive agent visual checking hole etc. are arranged at the structural member during the work, this air releasing hole may not be provided.

In reference to the connector constructed in accordance with the second preferred embodiment of the present invention as described above, the connecting method for connecting the structural members and the connecting structure between the structural members will be described as follows.

Work Example 2

Figure 7:
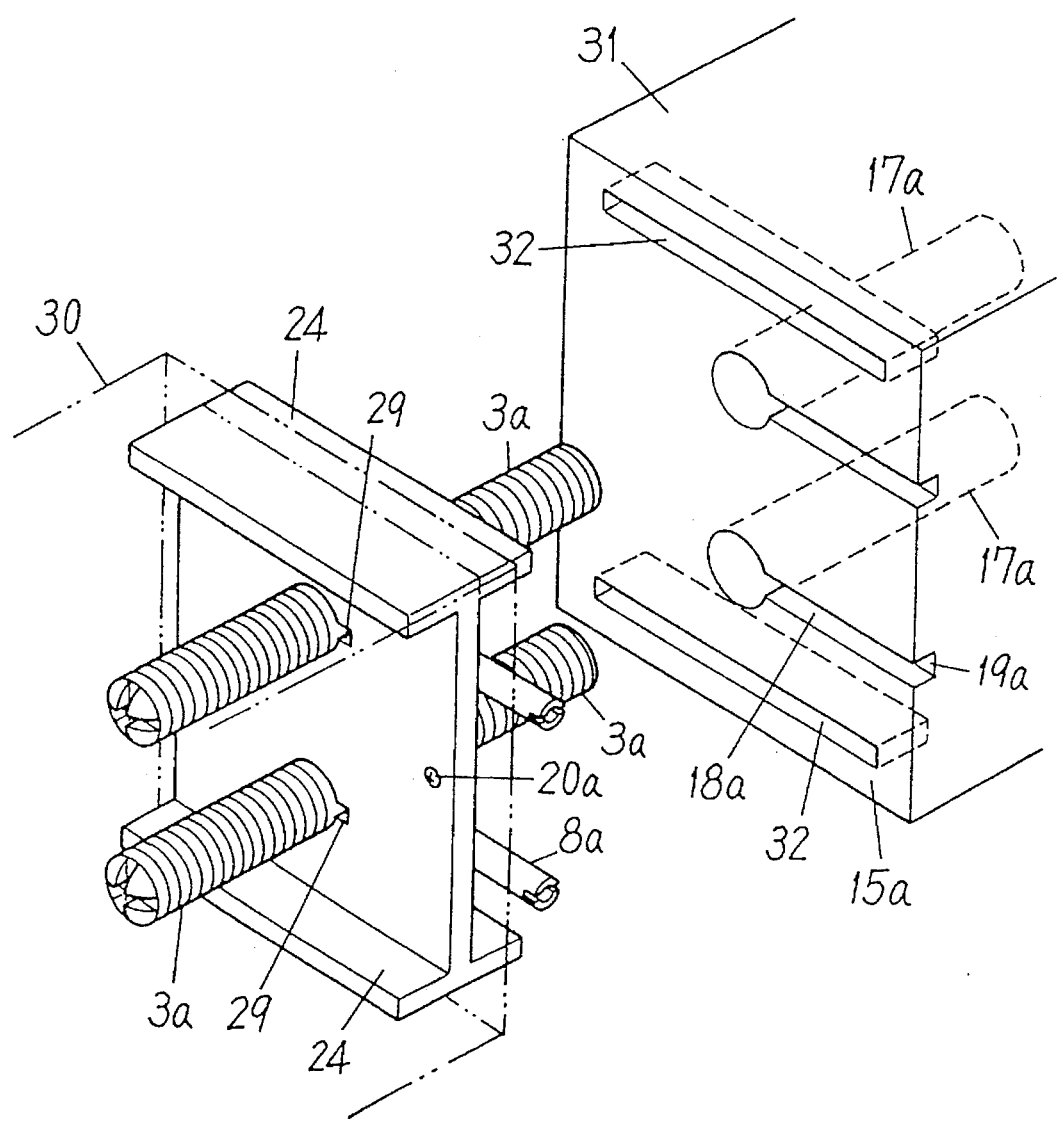
FIG. 7 is a perspective view showing a substantial part when a thrust joint execution for a beam is carried out by using a connector in a second preferred embodiment of the present invention.

FIG. 7 is a perspective view showing a substantial part when a thrust joint execution is carried out for a beam by using a connector in a second preferred embodiment of the present invention. FIG. 8-*a* is a sectional view of a central substantial part of a connecting hole showing a state when a thrust joint execution for a beam is carried out by using a connector in a second preferred embodiment of the present invention. FIG. 8-*b* is a sectional view of a central substantial part of a connecting hole showing a state after a thrust joint execution for a beam is carried out by using a connector in a second preferred embodiment of the present invention.

30, 31 denote a beam member for carrying out a thrust joint execution; 16a denotes a connecting plate fixing concave part formed in the same depth as a thickness of the connecting plate 2a so as to fit the connecting plate 2a to the connecting surface 15a of the beam 30; 17a denotes a connecting hole formed slightly larger than a diameter of the tubular member 3a of the connector la at the thrust connecting surface 15a for the beams 30, 31; 18a denotes a branch pipe installing groove cut and formed at the abutting surface of the connecting hole 17a for installing the branch pipe 8a; 19a denotes an opening of the branch pipe installing groove 18a; 20a denotes a small screw for fixing the connector 1a to the connecting surface of a beam member 30; and 32 denotes a concave part for fitting a reinforcing plate 24 for preventing shearing formed at the thrust connecting surface. In FIG. 8, 21 denotes an adhesive agent pouring gun; 22 denotes an adhesive agent poured from the branch pipe 8 and filled through the hollow part 5a of the tubular member 3a until a returning flow is visually confirmed at the opening 19a of the branch pipe installing groove 18a while filling the connecting hole 17a; and 23a denotes a wooden or synthetic resin plug for applying a lid to the opening 19a of the branch pipe installing groove 18a after thrust joint and making it in flush with the beam surface.

The work in the present preferred embodiment is carried out such that at first the abutting surface of one of the beam members 30, 31 performing a thrust joint to which the connector 1a is fixed is formed with the connecting plate fixing concave part 16a having the same depth as a thickness of the connecting plate 2a. Then, a connecting hole 17a communicating with the abutted surfaces of the beam members 30, 31, having a diameter slightly larger than a diameter of the tubular member 3a of the connector 1a and having the same depth as a thickness of the connecting plate 3a is punched with a drill and the like. In addition, at the side where the branch pipe 8a is engaged, the abutting surface of the connecting hole 17a is formed with the branch pipe installing groove 18a for use in installing the branch pipe 8a. In addition, it is also formed with a concave part 32 for fitting the reinforcing plate 24 for preventing a shearing action.

Then, the tubular member 3a of the connector 1a to which the branch pipe 8a is engaged is inserted into the connecting hole 17a of the beam 30 where the connecting plate fixing concave part 16a is formed, and the connector 1a is inserted into and fixed to it by small screws 20a.

Then, the tubular member 3a of the connector 1a is inserted into the connecting hole 17a of the beam 31 for thrust connecting with the beam 30 having the connector 1a inserted and fixed thereto, the beams 30, 31 are abutted to each other and temporarily fixed by strap bolts and other supports.

Then, the adhesive agent pouring gun 21 is installed at the opening of the branch pipe 8a, the adhesive agent 22 is filled in the connecting hole 17a through the hollow part 58 of the tubular member 3a until the adhesive agent 22 is visually confirmed at the opening 19a of the branch pipe installing groove 18a while the connecting hole 17a is being filled with the adhesive agent. As shown in FIG. 8-*a*, the adhesive agent 22 is filled or poured from the branch pipe hollow part 10 as indicated by an arrow, passes through the hollow part 5a of the tubular member 3a and charges a clearance between the tubular member 3a and a circumferential wall of the connecting hole 17a without glue non-uniformity under an effect of buffer. In turn, the adhesive agent 22 got from the hollow part 5a of the tubular member 3a where the branch pipe 8a is not engaged while the connecting plate 2a is being held is also returned from the air releasing hole 29 formed at the connecting plate 2a without glue non-uniformity and it is visually confirmed that the adhesive agents are merged at the branch pipe installing groove and ascend.

After the adhesive agent 22 is visually confirmed at the opening 19a of the branch installing groove 18a, the engagement of the branch pipe 8a is released from the tubular member 3a and as shown in FIG. 8-*b*, the plug 23a is applied to cover in flush with the opening 19a of the branch pipe installing groove 18a.

As described above, according to the present preferred embodiment, it is possible to make the connector easily at a site according to a size of the structural member to be connected and a required strength by removably engaging the tubular member to the connecting plate. In addition, since there may be provided one branch pipe for pouring adhesive agent by communicating with the hollow part of the connecting member, it is possible to improve a workability of pouring the adhesive agent, shorten a working time and further improve a process. A large formation of only the connecting member enables a bending stress of the connecting surface to be more increased. In addition, the reinforcing plate is arranged at the connecting plate to enable its shearing or twisting to prevent from being generated there.

Preferred Embodiment 3

Figure 9:
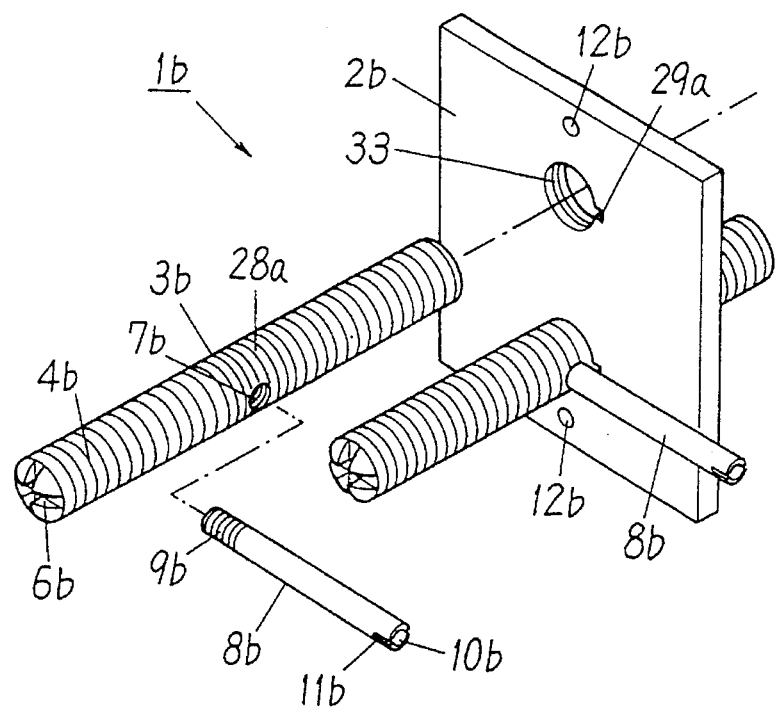
FIG. 9 is an entire perspective view showing a connector in a third preferred embodiment of the present invention.
Figure 10:
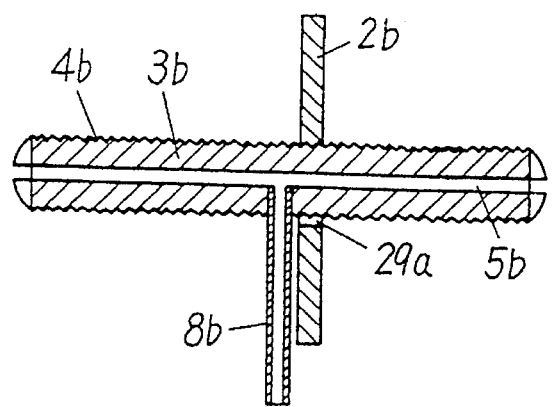
FIG. 10 is a sectional view of a substantial part of a connector in a third preferred embodiment of the present invention.

FIG. 9 is an entire perspective view for showing a connector in a third preferred embodiment of the present invention. FIG. 10 is a sectional view of a substantial part or a connector in a third preferred embodiment of the present invention.

1b denotes a connector in a third preferred embodiment of the present invention; 2b denotes a metallic rectangular flat plate-like connecting plate; 3b denotes a metallic hollow rod-type tubular member; 4b denotes a concave or convex part formed at the surface of the tubular member 3b; 5b denotes an adhesive agent pouring hollow part having both ends formed and opened in a longitudinal direction of a central part of the tubular member 3b; 6b denotes adhesive agent guiding grooves formed in concave shape at both ends of the tubular member 3b; 7b denotes a branch pipe engage part communicated and punched up to the hollow part 5b at a substantial central part in a longitudinal direction and threadably formed; 8b denotes a branch pipe threadably engaged with the branch pipe engage part 7b of the tubular member 3b; 9b denotes an engage part formed at one end of the branch pipe 8b so as to be threadably engaged with the branch pipe engage part 7b; 10b denotes a branch pipe hollow part formed at the branch pipe 8b and communicated with the hollow part 5b of the tubular member 3b; 11b denotes a driver groove formed at one end of the branch pipe 8b; 12b denotes a fixing hole formed at the connecting plate 2b so as to insert and fix the connector 2b into and to the connecting surface of the structural member and fix it by small screws etc.; 28a denotes a connecting plate engage part formed at an outer circumference of a substantial central part of the tubular member 3b in its longitudinal direction; 29a denotes an air releasing hole; and 33 denotes a threaded hole for threadably engaging the tubular member 3b to the connecting plate 2b.

In this case, although the air releasing hole 29a is formed at the outer circumference of the hole 33 of the connecting plate 2b, it may also be possible that the surface of a substantial central part in a longitudinal direction of the tubular member 3b is formed with a longer concave groove than a thickness of the connecting plate 2b. During the installing work, in the case that the structural member is provided with the air releasing and adhesive agent visual confirming hole, the air releasing hole 29a may not be formed.

The method for connecting the structural members and the connecting structure between the structural members will be described in reference to the connector in the third preferred embodiment of the present invention constructed as above.

Work Example 3

Figure 11:
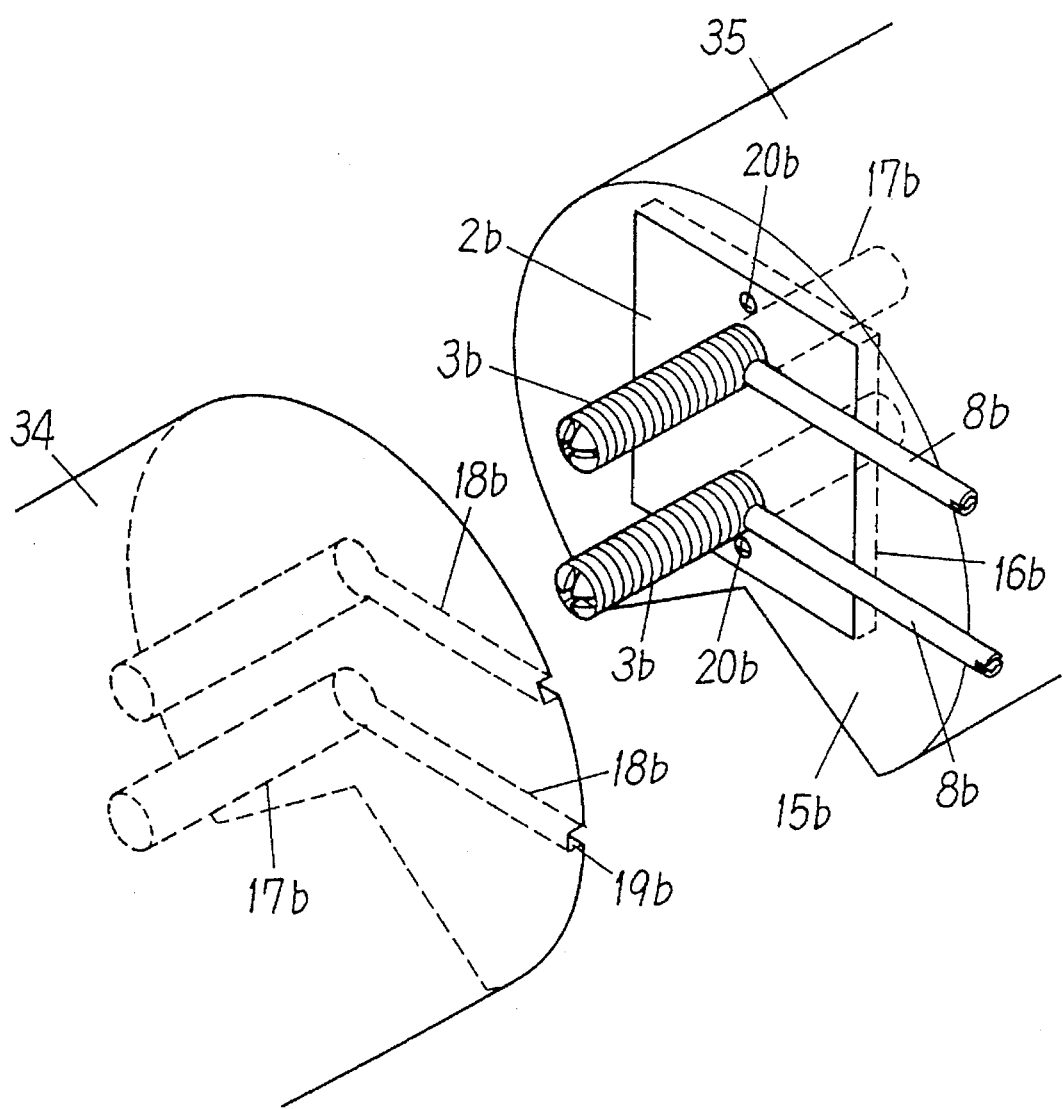
FIG. 11 is a perspective view of a substantial part when a thrust joint execution for a log member is carried out by using a connector in a third preferred embodiment of the present invention.
Figure 12:
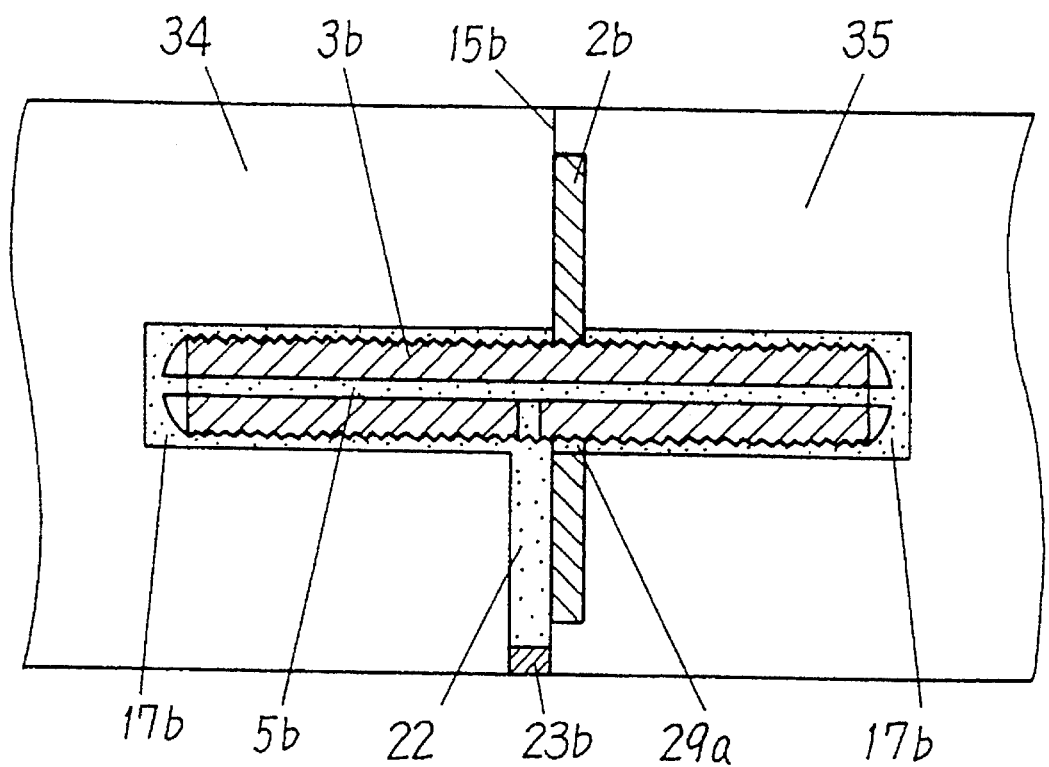
FIG. 12 is a sectional view of a central substantial part of a connection hole to indicate a state after a thrust joint execution for a log member by using a connector in a third preferred embodiment.

FIG. 11 is a perspective view of a substantial part when log members are thrust engaged by using the connector in the third preferred embodiment of the present invention. FIG. 12 is a sectional view of a central substantial part of a connecting hole for showing a state after the log members are thrust engaged by using the connector of the third preferred embodiment of the present invention.

34, 35 denote log members to be thrust engaged to each other; 16b denotes a connecting plate fixing concave part formed in the same depth as a thickness of the connecting plate 2b so as to fit the connecting plate 2b to the connecting surface 15b of the log member 35; 17b denotes a connecting hole formed at the thrust surface; 18b denotes a branch pipe installing groove cut and formed at the connecting surface 15b of the connecting hole 17b so as to install the branch pipe 8b; 19b denotes an opening of the branch pipe installing groove 18b; and 20b denotes a small screw for use in fixing the connector 1b to the connecting surface 15b of the log member 35.

At first, the connecting surface 15b of one of the log members 34, 35 to perform a thrust engagement so as to fix the connector 1b is formed with the connecting plate fixing concave part 16b having the same depth as a thickness of the connecting plate 2b. Then, the connecting hole 17b communicated with the abutting surfaces of the log members 34, 35, having a diameter slightly larger than a diameter of the tubular member 3b of the connector 1b and further having a depth corresponding to a length of each of the tubular members 3b is punched with a drill and the like. At the side where the branch pipe 8b is engaged, the abutting surface of the connecting hole 17b is formed with a branch pipe installing groove 18b for use in installing the branch pipe 8b.

Then, the tubular member 3b of the connector 1b having the branch pipe 8b and the tubular member 3b engaged thereto is inserted into the connecting bole 17 of the log member 35 formed with the connecting plate fixing concave part 16b, the connecting plate 2b of the connector 1b is fitted into and fixed to the connecting plate fixing concave part 16b and fixed by the small screws 20b. Then, the tubular member 3b of the connector 1b is inserted into the connecting hole 17b of the log member 34 to thrust engage with the log member 35 to which the connector 1b is inserted into and fixed, thereby the log members 34, 35 are abutted to each other and temporarily fixed by the support jigs such as the strap bolts.

Then, the adhesive agent pouring gun (not shown) is installed from opening of the branch pipe 8b in the same method as that of the first preferred embodiment and the adhesive agent is filled in the connecting hole 17b in the same method as that of the second preferred embodiment until the adhesive agent 22 is visually confirmed at the opening 19b of the branch pipe installing groove 18b, thereafter the plug 23b is embedded in flush with the opening.

As described above, according to the present preferred embodiment, one tubular member is removably engaged with the threaded hole member engage part of the connecting plate, thereby the connector corresponding to a size of the structural member or a required strength can be easily assembled at the site. In addition, this is a simple structure for forming the threaded hole member engage part at the connecting plate and the connector can be made at a low cost.

In addition, since the tubular member can be engaged even after the connecting plate is fixed to the connecting surface of the composing member, its workability and installing work can be improved.

Preferred Embodiment 4

Figure 13:
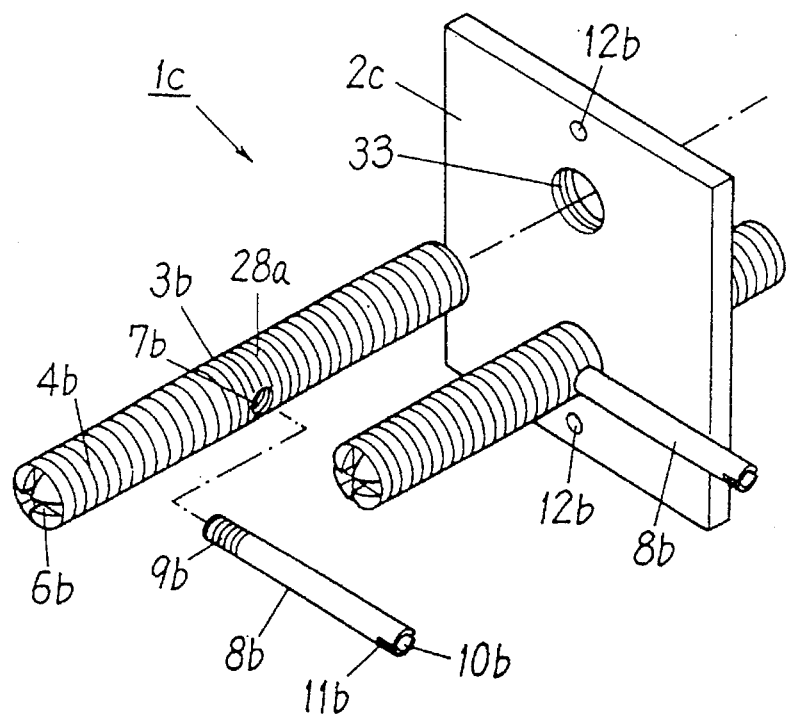
FIG. 13 is an entire perspective view showing a connector in a fourth preferred embodiment of the present invention.
Figure 14:
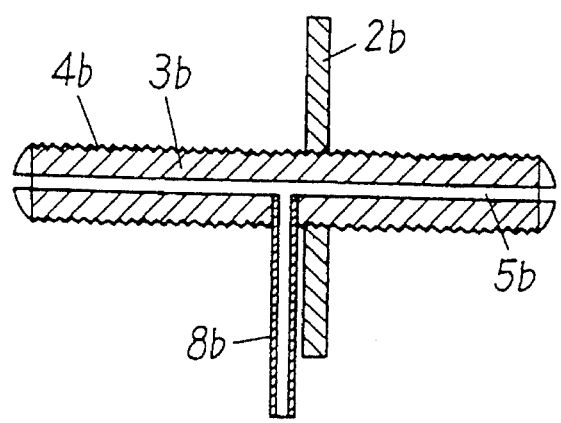
FIG. 14 is a sectional view of a substantial part of a connector in a fourth preferred embodiment of the present invention.

FIG. 13 is an entire perspective view of a connector in a fourth preferred embodiment of the present invention. FIG.

14 is a sectional view of a substantial part of the connector in the fourth preferred embodiment of the present invention.

1c denotes a connector in the fourth preferred embodiment of the present invention, and a part differing from that of the third preferred embodiment consists in the fact that the connecting plate 2c is not provided with an air releasing hole at an outer circumference of the hole 33 threadably engaged with the tubular member.

The connecting method for the structural members and the connecting structure between the structural members will be described as follows in reference to the connector in the fourth preferred embodiment of the present invention constructed as described above.

Working Example 4

FIG. 15-a is a sectional view of a central substantial part of the connecting hole showing a state when the thrust joint work for a beam is carried out with the connector in the fourth preferred embodiment of the present invention. FIG. 15-b is a sectional view of a central substantial part of a connecting hole showing a state after the thrust joint work for a beam is carried out with the connector in the fourth preferred embodiment of the present invention.

30, 31 denote beams to be thrust connected; 16c denotes a connecting plate fixing concave part formed in the same depth as a thickness of the connecting plate 2c so as to fit the connecting plate 2c to the connecting surface 15c of the beam 31; 17c denotes a connecting hole formed at the thrust connecting surface; 18c denotes a branch pipe installing groove cut and formed at the abutting surface of the connecting hole 17c so as to install the branch pipe 8b; 19c denotes an opening of the branch pipe installing groove 18; 29b denotes an air releasing and adhesive agent visual confirming hole formed to be communicated from a part near an opening of the connecting hole formed in the beam 31 having no branch pipe installing groove 18c formed therein up to the surface of the beam; 29c denotes an opening of the air releasing and adhesive agent visual confirming hole 29b; 21 denotes an adhesive agent pouring gun; 22 denotes adhesive agent poured from the branch pipe 8b, passed through the hollow part 5b of the tubular member 3b, and filled until a returning flow is visually confirmed at the opening 19c of the branch pipe installing groove 18c and the opening 29c of the air releasing and adhesive agent visual confirming hole 29b; 23c denotes a wooden or synthetic resin plug for applying a lid to the opening 19c of the branch pipe installing groove 18c after thrust connection and making it in flush with the beam surface; and 23d denotes a plug similar to the plug 23c for applying a lid to the opening 29c of the air releasing and adhesive agent visual confirming hole 29b and making it in flush with the beam surface.

At first, the connecting surface 15c of the beam 31 having the connector 1c fixed of beam members 30, 31 for thrust engaging is formed with the connecting plate fixing concave part 16c having the same depth as a thickness of the connecting plate 2c. Then, the connecting hole 17c communicated with the abutting surfaces of the beams 30, 31, having a diameter slightly larger than a diameter of the tubular member 3b of the connector 1c and having a depth corresponding to a length of the tubular member 3b is punched by a drill and the like. At the side to which the branch pipe 8b is engaged, the abutting surface of the connecting hole 17c is formed with the branch pipe installing groove 18c for installing the branch pipe 8b. In addition, an air releasing and adhesive agent visual confirming hole communicating from the surface of the beam member 31 with the connecting hole 17c is arranged near the opening of the connecting hole 17 of the beam member 31 having no branch pipe installing groove 18c formed therein. In this case, in place of the air releasing and adhesive agent visual confirming hole, a groove may be formed.

In this case, the branch pipe 8b and the tubular member 3b of the connector 1c to which the tubular member 3b is engaged are inserted into the connecting hole 17c of the beam member 31 where the connecting plate fixing concave part 16c, the connector 1c is fitted to the connecting plate fixing concave part 16c and fixed by small screws (not shown). Then, the tubular member 3b of the connector 1c is inserted into the connecting hole 17c of the beam member 30 for thrust connecting to the beam member 31 having the connector 1c inserted and fixed thereto, the beam members 30 and 31 are abutted to each other and temporarily fixed by support jigs such as strap bolts.

Then, the adhesive agent pouring gun 21 is installed from the opening of the branch pipe 8b, the adhesive agent 22 passes through the hollow part 5b of the tubular member 3b and is filled in the connecting hole 17c until the adhesive agent 22 is visually confirmed at the opening 19c of the branch pipe installing groove 18c and the opening 29c of the air releasing and adhesive agent visual confirming hole 29b while the adhesive agent is filling the connecting hole 17c. Although the adhesive agent 22 is normally confirmed to return back in a substantial concurrent manner to both opening 19c of the branch pipe installing groove 18c and the opening 29c of the air releasing and adhesive agent visual confirming hole 29b, in the case that one adhesive agent returning flow is delayed and the other adhesive agent returning flow is fast due to an elongation of the tubular member 3b, an over-flow of the adhesive agent is restricted by a cloth and the like and a pouring of the adhesive agent 22 is carried out until the returning-back of the other adhesive agent is confirmed. With such an arrangement as above, the adhesive agent 22 can be filled in the connecting hole 17c without glue non-uniformity and the safety can be improved by stronger connection.

Upon visual confirmation of the adhesive agent 22 in the opening 19b of the branch pipe installing groove 18b and in the opening 29c of the air releasing and adhesive agent visual confirming hole 29b, the engagement of the branch pipe 8b is released from the tubular member 3b, and then the plugs 23c and 23d are embedded in the opening 19b of the branch pipe installing groove 18b and the opening 19c of the air releasing and adhesive agent visual confirming hole 29b as indicated in FIG. 15-b in flush with them.

As described above, according to the present preferred embodiments, the tubular member is removably engaged with the connecting plate. As the result, the connector can be easily manufactured at site in response to a size of the structural members to be connected or their required strength.

In addition, since the connector is not provided with the air releasing hole, the number of steps of manufacturing connector can be reduced and the connector can be made at a low cost. In addition, one branch pipe can be attained, so that workability of pouring of the adhesive agent can be improved and its working period is also shortened.

What is claimed is:

1. A connector comprising a connecting plate formed in a flat plate; a hollow tubular member having each of its base parts fixed to both surfaces of said connecting plate and the other end opened; a branch pipe engage part communicating from a side part of the base part of said tubular member to a hollow passage through said tubular member; and a hollow branch pipe having an engage part formed at at least one end thereof removably engaged with said branch pipe engage part.

2. A connector comprising a connecting plate formed in a flat plate; a hollow connecting member having a convex or a concave member engage part at both ends fixed to a hole punched at the plate surface of said conncting plate or removaby inserted into the hole; a branch pipe engage part communicating from the side surface of said connecting member to a hollow passage through said tubular member; and said hollow connecting member having a connecting plate engage part removably engaged with said member engage part at the base part of said hollow connecting member.

3. A connector comprising a connecting plate formed in a flat plate; holes punched at a plate surface of said connecting plate; a hollow tubular member having both ends opened fixed to or removably inserted into said hole; a branch pipe engage part communicating from a side part of a central longitudinal part of said tubular member to a hollow passage through said tubular member; and a hollow branch pipe having an engage part removably engaged with said branch pipe engage part formed at at least one end thereof.

4. A connector according to claim 1 in which the surface of said tubular member is formed with a projection part or a concave or convex part.

5. A connector according to any of claims 1 to 4 in which said branch pipe is fixed to said branch pipe engage part.

* * * * *